Dec. 26, 1944. B. J. BRANDER 2,365,861
SHAVING APPARATUS
Filed April 17, 1944  2 Sheets-Sheet 1

Inventor
B. J. Brander
By Hancock Downing Seebold
Attys.

Dec. 26, 1944.   B. J. BRANDER   2,365,861
SHAVING APPARATUS
Filed April 17, 1944   2 Sheets-Sheet 2

Inventor
B. J. Brander

Patented Dec. 26, 1944

2,365,861

UNITED STATES PATENT OFFICE 2,365,861

SHAVING APPARATUS

Bertil Johan Brander, Stockholm, Sweden

Application April 17, 1944, Serial No. 531,425
In Sweden April 30, 1943

10 Claims. (Cl. 30—43)

The present invention relates to that kind of shaving apparatus for dry shaving in which a thin protecting grid, intended to be pressed against the skin during the shaving, cooperates with a cutting member gliding against the inside of the grid, the said cutting member cutting off the hairs of the beard entering through the holes of the grid.

According to the invention the cutting member is made in the form of one or more extremely thin, highly elastic blades fixed to a member, which is movable relatively to the grid, in such a way that they form arc-shaped springs braced up against the grid, whereby the edges of the blades are continuously held in contact with the grid with a very weak and elastic spring-pressure. By this arrangement the friction between the edges of the blades and the grid will be minimal, the driving power will be the smallest possible irrespective of the apparatus being driven manually or by an electric motor, the wear of the grid and the blades is reduced to a minimum, and the edges of the blades follow the inner surface of the grid exactly even if the said surface should not be quite regular.

The application of the invention is illustrated on the accompanying drawings in a manually driven as well as in a motor driven dry shaving apparatus.

Figure 1:
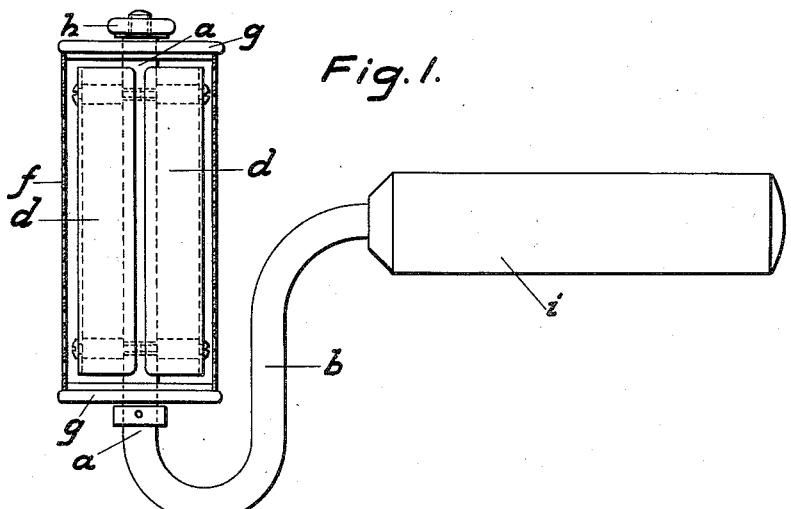
Figure 2:
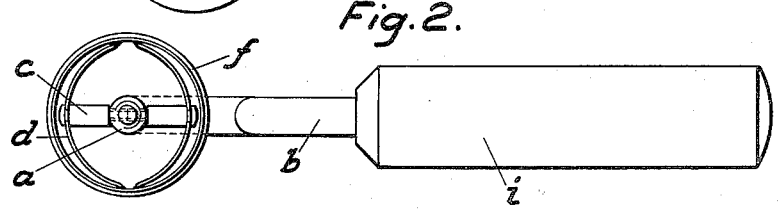
Figure 3:
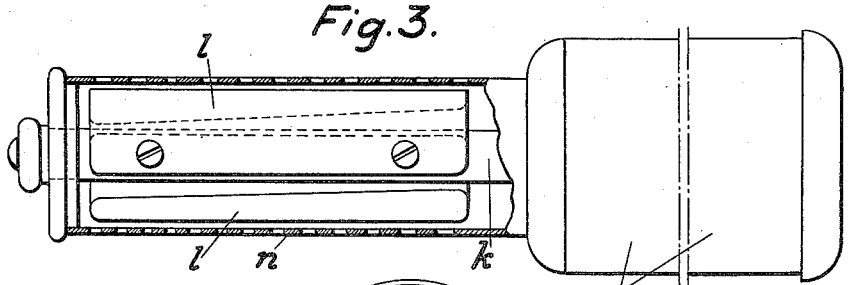
Figure 4:
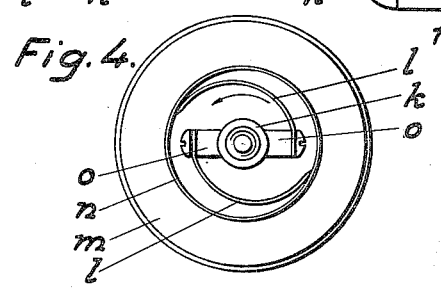
Figure 5:
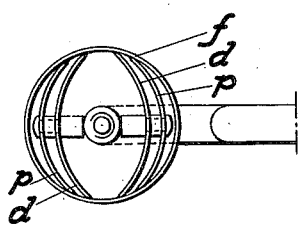
Figure 6:
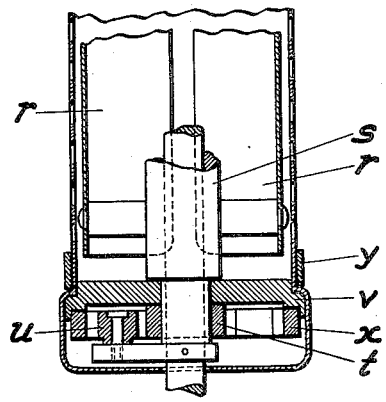
Figure 7:
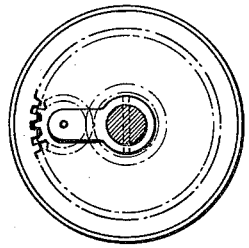

Figs. 1 and 2 show the manually driven apparatus which has a rotatable cylindric grid and stationary blades. Figs. 3 and 4 show a motor driven apparatus with stationary grid and rotatable blades. Figs. 5 to 7 show two modifications of the manually driven apparatus.

The apparatus shown in Figs. 1 and 2 has a holder $b$ formed to a stationary shaft $a$ and provided with a handle $i$. In the shaft $a$ there are inserted four small pins $c$ on which two blades $d$ are fixed. The said blades are made of very elastic steel foil with a thickness of about 0.03–0.05 mm. only. (On the drawings the thickness of the blades is very exaggerated for the sake of clearness.) The cylindric grid $f$ is carried by two end pieces $g$ which are loosely fitted at the ends of the grid and are rotatably mounted on the shaft $a$. The three elements $f$ and $g$ always follow each other during the rotation due to the friction at the fitting-in places of the end pieces $g$ and thus they form together an easily movable roller which is held together by a nut $h$ screwed on the free end of the shaft $a$. The pins $c$ are made as long as possible without contacting the grid $f$. By placing the tubular grid $f$ over the extremely thin and elastic blades $d$ which, when left free, are quite flat, they are braced up against the grid so as to form arc-shaped springs of approximately semi-cylindrical shape, their sharpened edges resting with an extremely weak springforce against the grid at almost diametrically opposite points. Thus, by this arrangement of the blades two pairs of edges are obtained, each pair having their edges located very near each other in opposite directions. When at the use of the apparatus the roller rotates to and fro on the skin, the two edges of one pair will thus alternately cut the hairs of the beard entering through the holes of the grid. The two edges at the opposite side of the roller are now inactive, but they are simultaneously sharpened by sliding against the grid. In consequence the two pairs of edges should preferably be used alternately. Due to the extremely weak spring-pressure of the edges of the blades against the tubular grid $f$ the blades will function in such a way that, while the one of a pair of adjacent edges is cutting, the other edge is pressed inwards by the hairs of the beard penetrating through the holes of the grid, which enables an effective alternate cutting action at the movement of the apparatus to and fro on the skin. Another advantage of the thin blades is that they require very little space, so that there is plenty of room for the cut-off hairs in the interior of the apparatus. The placing of the blades close to the grid and the semicylindrical form of the blades also contribute hereto because most of the hairs of the beard gathers between the blades. The apparatus is easily emptied after removal of the nut $h$ and the outer end piece $g$.

In the apparatus shown in Figs. 3 and 4 the shaft $k$ which carries the blades $l$, is adapted to be set in rotation by means of a small electric motor located in the handle $m$, the tubular grid $n$ being rigidly connected with the said handle. As the blades $l$ in this apparatus always rotate in the same direction, each blade is provided with one cutting edge only and is fixed at the opposite edge on small pins $o$ which are inserted in the shaft $k$ in the same way as in the apparatus according to Figs. 1 and 2. This apparatus may also be carried out in such a way that the shaft with the blades rotates to and fro, which can be obtained by a simpler electromagnetic driving device than a motor with rotating armature. In this case the blades may preferably be provided with two sharpened edges as in the apparatus according to Figs. 1 and 2. With this arrangement the grid evidently need not be provided with holes around but only on a sector corresponding to the angle of rotation of the shaft.

The modification shown in Fig. 5 differs from the apparatus according to Figs. 1 and 2 so far that, in addition to the blades $d$, it is provided with a second pair of blades $p$ located in the same way as the previous blades, whereby the apparatus obtains four active edges on each side.

Another modification of the same apparatus is shown in Figs. 6 and 7, the blades not being rigidly connected with the holder but adapted to rotate in opposite direction to the grid. For this purpose the blades $r$ are fixed on a bushing $s$ rotatable round the shaft and provided with a small toothed wheel $t$ which by means of a toothed wheel $u$, located on a stationary shaft, and by means of a toothed ring $x$ with inside teeth, fixed to one end piece $v$ of the roller, is set in rotation in opposite direction to the grid when the latter rolls on the skin. In order to increase the friction a ring $y$ of rubber or the like can be provided round the grid.

Having now described my invention, what I claim as new and desire to secure by Letters Patent is:

1. A shaving apparatus for dry shaving, having a protecting grid adapted to be pressed against the skin during shaving, a member movable relatively to said grid, one or more extremely thin and elastic spring-blades fixed to said movable member and, by being braced up in arc-shape against the grid, adapted to hold their cutting edges continuously in contact with the grid with a very weak and elastic spring force.

2. A shaving apparatus according to claim 1, having spring-blades made of steel foil with a thickness not exceeding 0.03 mm.

3. A shaving apparatus according to claim 1, having spring-blades made of steel foil with a thickness not exceeding 0.04 mm.

4. A shaving apparatus according to claim 1, having spring-blades made of steel foil with a thickness not exceeding 0.05 mm.

5. A shaving apparatus as claimed in claim 1, in which the spring-blades are fixed to a shaft rotatable to and fro relatively to the grid, and are arranged in such a way that two adjacent edges are directed in opposite directions, whereby cutting action is obtained at the rotation of the shaft, or of the grid respectively, in the one as well as in the other direction.

6. A shaving apparatus as claimed in claim 1, in which two double-edged spring-blades are fixed to a shaft rotatable to and fro relatively to the grid, and are arranged in such a way that two adjacent edges are directed in opposite directions, whereby cutting action is obtained at the rotation of the shaft, or of the grid respectively, in the one as well as in the other direction, the said double-edged spring-blades being braced up against the grid so as to form about semi-cylindric arcs, their cutting edges resting against the grid at almost diametrically opposed points.

7. A shaving apparatus as claimed in claim 1, in which four double-edged spring-blades are fixed to a shaft rotatable relatively to the grid, and are arranged in such a way that two adjacent edges are directed in opposite directions, whereby cutting action is obtained at the rotation of the shaft, or of the grid respectively, in the one as well as in the other direction, the said double-edged spring-blades being braced up against the grid so as to form about semi-cylindric arcs their cutting edges resting against the grid at almost diametrically opposed points.

8. A shaving apparatus provided with a rotatable tubular protecting grid cooperating with stationary very thin and elastic spring-blades braced up in arc-shape against the grid, the grid being carried by two end pieces serving as enclosure and as hubs, the said end pieces being rotatably mounted on a stationary shaft carrying the spring-blades, one of the said end pieces being easily removable for emptying the apparatus.

9. A shaving apparatus for dry shaving, having a protecting grid adapted to be pressed against the skin during shaving, a member movable relatively to said grid, one or more extremely thin and elastic spring-blades fixed to said movable member and, by being braced up in arc-shape against the grid, adapted to hold their cutting edges continuously in contact with the grid with a very weak and elastic spring force, the said blades being fixed to a part rotatable round a shaft and connected by means of a transmission gear with the grid in such a way that the blades are made to rotate in opposite direction to the grid when the latter is set in rotation.

10. A shaving apparatus as claimed in claim 1, in which the cutting member comprises only one double-edged spring-blade fixed to a member rotatable to and fro, in such a way that it is braced up against the grid so as to form almost a whole cylinder, whereby the two blade edges directed in opposite directions will rest against the grid close to one another.

BERTIL JOHAN BRANDER.